UNITED STATES PATENT OFFICE.

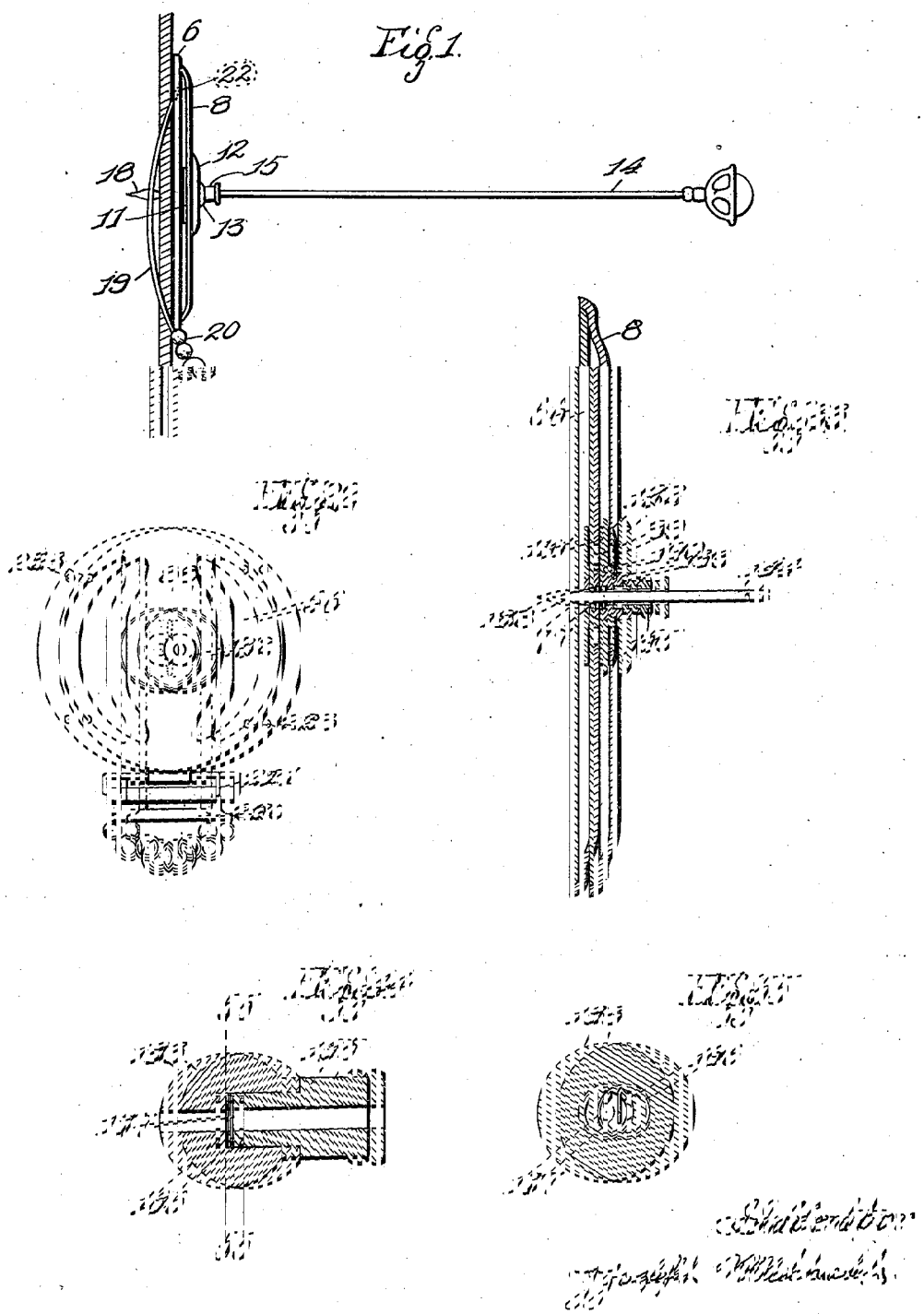

JOSEPH MICHAELS, OF ST. LOUIS, MISSOURI.

SAFETY HATPIN.

1,413,231.    Specification of Letters Patent.    Patented Apr. 18, 1922.

Application filed July 17, 1919. Serial No. 311,490.

*To all whom it may concern:*

Be it known that I, JOSEPH MICHAELS, a citizen of the United States, and resident of St. Louis, Missouri, have invented certain new and useful Improvements in a Safety Hatpin, of which the following is a specification.

This invention relates to improvements in a safety hat-pin and has for its object a pin operating through a supporting member which is attached to the hat and which is equipped with a frictional means whereby the pin is held in its adjusted position, and a means whereby the pin is directed through the same perforation made through the hat, the point of said pin being so flattened or spread as to prevent the same from being withdrawn from the supporting means.

A further object of my invention is to construct a pin to be used in connection with a lady's hat, said pin being so shaped at the point as to prevent the same from being entirely withdrawn and becoming lost and a means for supporting the pin so that the point will at all times be directed through the same aperture in the hat thus preventing the destruction of said hat.

Figure 1, is a side elevation of my improved device shown in position on the hat.

Fig. 2, is an enlarged front view of the same.

Fig. 3, is an enlarged sectional view.

Fig. 4, is an enlarged detail sectional view, of the swivel and clamping means made use of for supporting the pin.

Fig. 5, is a cross sectional view taken on the line 5—5 of Fig. 4.

The general structure of my invention consists of a disc 6, having a central perforation 7, this disc is firmly attached in any desirable well-known manner to an outer casing or partition 8. This partition may be of any suitable and ornamental design, the same being preferably arranged and shaped as that shown in Figs. 2 and 3. In the center of this partition is provided an elongated slot 9, and through this slot is inserted the shank 10 which is attached to an inner plate 11 which is located between the casing 8 and the disc 6 and to the outer edge of the same is attached a disc 12.

In the disc 12, shank 10 and plate 11 is supported a pin supporting ball 13, which is seated in the socket formed in the plate 11 and disc 12, and the same is clamped in the plate sufficiently so as to prevent removal but yet to allow the ball to move around in the socket. This ball is provided with a bore through which the hat-pin 14 is passed and in the ball is located a sleeve 15 which is likewise provided with a central bore for the support of the hat-pin 14.

In the ball is located a spring 16 which is of a size sufficient to fit the internal bore and which has a downward projection 17 which comes in contact with a pin which is inserted in the central bore, and the pressure of said spring has a tendency when contacting with the pin to hold it by friction at any position in which the pin is thrust through the opening.

The end or point of the pin is provided with a flattened surface 18. This surface is slightly larger than the bore or aperture so as to prevent the pin from being entirely withdrawn through the ball. This flattened surface is of such shape as not to injure the hat as the hat-pin is forced through the same in order to support the hat on the head.

The purpose of the slot 9 is to allow a vertical adjustment so that the pin may be thrust through the hat and be regulated according to the contour of the head and by means of the center aperture 7 in the disc 6 it will cause the pin to enter the same hole made in the hat after the device has been fastened in position thus preventing the pin from puncturing the hat in a plurality of places.

To one edge of the casing is hingedly mounted a fastening device by which the said casing is held to the hat. This device consists of a pair of pins 19, connected together by a yoke 20 which yoke is usually ornamented, these fastening devices passing through a swivel 21 which permits the prongs of the fastening device to be passed through the hat body at the bottom and then again at the top and the points inserted in openings 22 formed in the disc 6. The outer surface of the casing is provided with a plurality of holes 23 through which a needle and thread may be inserted when it is found desirable to sew or stitch the device to the hat.

The essential feature of my invention is not so much an attaching device as it is a structure which will hold a hat-pin in position so that the same cannot be removed and become lost and at the same time will permit the pin to be inserted through the same opening made in the hat as well as a frictional device for holding the pin in the proper inserted position.

Having fully described my invention what I claim is:

A hat-pin retainer of the character described, comprising a body member to which is hingedly connected a fastening device, said body member having a central hole, a skeleton disc attached to the body member, said skeleton disc having a central elongated opening, a pin supporting member consisting of a flange and a head 12, having a central connection which is to operate in the elongated slot, said pin supporting member having a socket formed therein, a ball supported in said socket and adapted to partially rotate therein, a sleeve supported in the ball, a spring located in the ball and in contact with the sleeve in combination with a hat-pin inserted through the sleeve and ball and against which the spring has frictional contact, the pin supporting member being so arranged as to permit the hat-pin to be tilted in either direction without the point passing out of the center hole formed in the body member, substantially as specified.

In testimony whereof, I have signed my name to this specification, in presence of two subscribing witnesses:

JOSEPH MICHAELS.

Witnesses:
 ALFRED A. EICKS,
 B. M. AUSTINE.